United States Patent

[11] 3,609,274

[72] Inventors Fred Bould
Pittsburgh;
Nagar J. Patel, East McKeesport, both of Pa.
[21] Appl. No. 6,242
[22] Filed Jan. 27, 1970
[45] Patented Sept. 28, 1971
[73] Assignee Westinghouse Electric Corporation
Pittsburgh, Pa.

[54] CIRCUIT BREAKER INCLUDING IMPROVED SUPPORTING FRAME
9 Claims, 2 Drawing Figs.
[52] U.S. Cl. ........................................... 200/168 A
[51] Int. Cl. .......................................... H01n 9/02
[50] Field of Search ............................... 200/168 A, 48, 50.15; 317/119, 103, 120

[56] References Cited
UNITED STATES PATENTS

| | | | |
|---|---|---|---|
| 2,647,247 | 7/1953 | Fulton et al. | 200/168 A X |
| 2,711,452 | 6/1955 | Spencer et al. | 200/50 AA |
| 2,777,024 | 1/1957 | West | 200/50 AA UX |
| 2,885,502 | 5/1959 | Eichelberger et al. | 200/50 AA |
| 3,328,648 | 6/1967 | Gryctko | 317/119 |
| 3,474,201 | 10/1969 | Bould | 200/168 A X |

*Primary Examiner*—H. O. Jones
*Attorneys*—A. T. Stratton and Clement L. McHale

ABSTRACT: A circuit breaker comprising a supporting frame structure including a rear wall portion and a bottom support plate projecting outwardly therefrom. The rear wall portion includes an upper crossmember and a plurality of insulating support members which project downwardly from the upper crossmember to be joined to the bottom support plate. Separable contact means are mounted on the insulating support members.

INVENTORS
FRED BOULD &
NAGAR PATEL

CIRCUIT BREAKER INCLUDING IMPROVED SUPPORTING FRAME

CROSS-REFERENCES TO RELATED APPLICATIONS

Certain inventions disclosed in this application are disclosed and claimed in copending application Ser. No. 770,149 filed Oct. 24, 1968, by Fred Bould and assigned to the same assignee as the present application.

BACKGROUND OF THE INVENTION

In the construction of certain types of circuit breakers, such as those of the horizontal drawout type, which are normally disposed in a metal-enclosed housing or cell, each circuit breaker includes its own supporting frame on which the main separable contacts of the circuit breaker and an associated operating mechanism are mounted. In the past, for relatively lower voltage applications, such as 600 volts (AC) and below, the supporting frame structure of such a circuit breaker generally included a rear panel or backplate which is normally formed from a metallic material, such as steel, as disclosed in U.S. Pat. Nos. 2,711,452, 2,777,024 and 3,174,021. In such known circuit breaker constructions, the rear panel or backplate included openings in which were supported electrically insulating members which passed through the openings and which, in turn, supported associated electrically conducting current carrying parts of the circuit breaker, such as the separable contact means. In another type of circuit breaker construction, a single insulating rear panel is provided and relied upon to support all other parts of the circuit breaker, such as disclosed in U.S. Pat. No. 2,338,715.

Known supporting frame structures for circuit breakers of the type described have certain disadvantages in that such frame structures may lack the structural strength which is desirable in a circuit breaker or are relatively complicated and include a relatively large number of structural members which must be assembled and secured together to form the supporting frame structure of the circuit breaker. In addition, no attempt is normally made in such known frame structures to take advantage of the structural strength of the electrically insulating members which are mounted on the frame structure or to provide such electrically insulating members with sufficient structural strength to thereby eliminate the need for certain structural members of the overall frame structure which would otherwise be required.

SUMMARY OF THE INVENTION

In accordance with the invention, a circuit interrupter or circuit breaker is provided which includes a supporting frame having a rear wall portion and a bottom support plate which projects outwardly from the rear wall portion. The rear wall portion of the supporting frame includes an upper metallic crossmember and a plurality of electrically insulating support members which are disposed in side-by-side relation across the rear wall portion and structurally form part of the rear wall portion of the supporting frame. The upper ends of the insulating support members are secured to the upper crossmember which may be angle-shaped in cross section. The insulating support members extend generally downwardly from the upper crossmember and the lower ends of the insulating support members are secured to a flange portion of the bottom support plate which is preferably formed integrally therewith and which is disposed adjacent to and extends across the rear wall portion of the supporting frame. A pair of spaced electrically conducting members or terminal members is mounted on each of the insulating support members. A relatively stationary contact assembly may be mounted on one of the electrically conducting members and a movable switch or contact arm may be mounted on the other electrically conducting member for movement between open and closed operating positions with respect to the associated stationary contact assembly. The bottom support plate is adapted to support the operating mechanism for the overall circuit breaker which actuates the respective contact arms of the circuit breaker between open and closed positions. Where desired, the supporting frame may also include a pair of metallic side sheets which are secured to the upper crossmember and to the bottom support plate at the opposite sides of the supporting frame and an additional upper crossmember which is disposed adjacent to the front of the supporting frame and which may be secured to the side sheets at the opposite sides of the supporting frame.

It is therefore an object of this invention to provide an improved supporting frame structure for circuit breakers.

BRIEF DESCRIPTION OF THE DRAWINGS

Other objects of the invention will be apparent from the following detailed description taken in conjunction with the accompanying drawings, in which.

DESCRIPTION OF THE PREFERRED EMBODIMENTS

Figure 1:
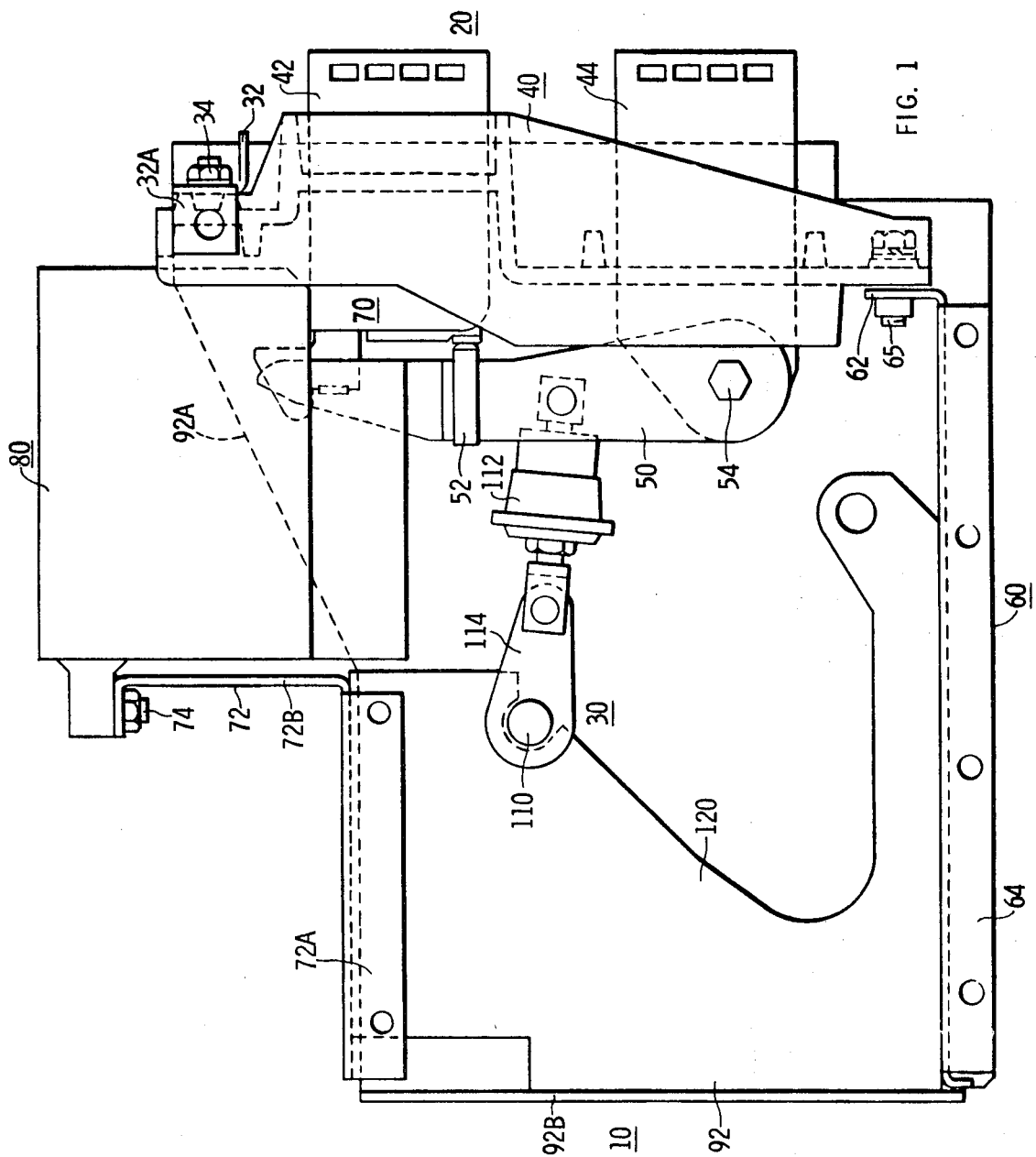
FIG. 1 is a side elevational view of a circuit breaker embodying the principal features of the invention with certain parts omitted for the sake of clarity.
Figure 2:
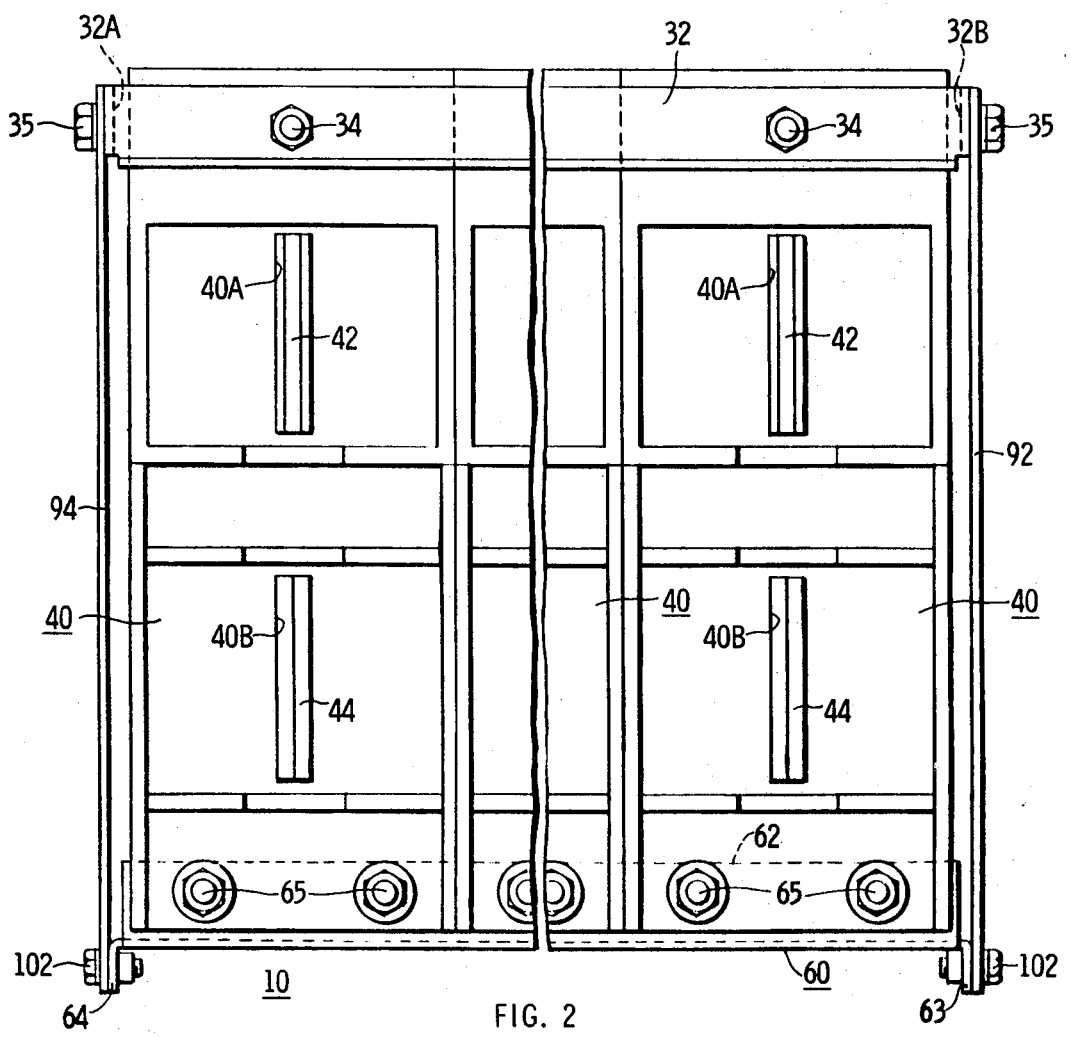
FIG. 2 is an end or back view of the circuit breaker shown in FIG. 1 with certain portions broken away.

Referring now to the drawings and FIG. 1 in particular, there is illustrated a circuit interrupter, more specifically a circuit breaker 10 embodying the teachings of the invention. The circuit breaker 10 may be of the type which is disclosed in greater detail in copending application Ser. NO. 770,296 which was filed Oct. 24, 1968, by F. Bould, R. Hauser and J. H. Taylor and which is assigned to the same assignee as the present application. As illustrated, the circuit breaker 10 is of the horizontal drawout type and includes a rigid supporting frame having a rear wall portion 20, which comprises an upper crossmember 32 and a plurality of electrically insulating support members 40, and a bottom support plate 60, as shown in FIGS. 1 and 2. The supporting frame of the circuit breaker 10 may be provided with rollers or wheels (not shown) to facilitate moving or rolling the circuit breaker 10 into and out of an associated cubicle or cell (not shown) in order to connect and disconnect the circuit breaker 10 in an electrical circuit which is to be opened and closed.

More specifically, the upper crossmember 32 which forms part of the rear wall portion 20 of the supporting frame of the circuit breaker 10 is formed from a suitable metallic material, such as steel, and, as illustrated, is generally angle-shaped in cross section. As best shown in FIG. 2, the cross member 32 extends laterally across the rear wall portion 20 of the supporting frame of the circuit breaker 10 adjacent to the top or upper end of said rear wall portion and includes a pair of ears or lug portions 32A and 32B at the opposite ends of said crossmember.

The electrically insulating support members 40 which form part of the rear wall portion 20 of the supporting frame of the circuit breaker 10 may be of the construction which is described in greater detail in copending application Ser. No. 770,149 filed Oct. 24, 1968, by Fred Bould and assigned to the same assignee as the present application. As illustrated, the insulating support members 40 are generally rectangular in configuration and are preferably formed from an electrically insulating material having a relatively high structural strength, such as a thermosetting resin material which may be of the polyester type and which is filled or reinforced with a suitable material such as glass. The insulating support members 40 may be formed by molding or casting. The insulating support members 40 are disposed in side-by-side relation across the rear wall portion 20 of the supporting frame of the circuit breaker 10, as best shown in FIG. 2, and extend vertically downwardly from the upper crossmember 32 to the bottom support plate 60, as best shown in FIG. 1. The upper ends of the insulating support members 40 are rigidly secured to the upper crossmember 32 by suitable means, such as the bolts 34, which pass through substantially aligned openings provided in the crossmember 32 and the respective insulating support members 40.

The bottom support plate 60 of the supporting frame of the circuit breaker 10 is preferably formed from a suitable metallic material, such as steel, and is disposed to project outwardly from the rear wall portion 20 of the supporting frame of the circuit breaker 10, which includes the crossmember 32 and the insulating support members 40 as just described, in a direction which is generally perpendicular to the rear wall portion 20 of said supporting frame. The bottom support plate 60 includes an upwardly extending or projecting flange portion 62 which is preferably formed integrally with the bottom support plate 60 at the rear of said bottom support plate and which extends laterally across the rear wall portion 20 of the supporting frame of the circuit breaker 10 as best shown in FIG. 2. The flange portion 62 of the bottom support plate 60 is disposed adjacent to the lower or bottom ends of the respective insulating support members 40 and the lower ends of the insulating support members 40 are rigidly secured to the flange portion 62. More specifically, the flange portion 62 of the bottom support plate 60 is rigidly secured to the lower ends of the insulating support members 40 by suitable means, such as a plurality of bolts 65, which pass through substantially aligned openings provided in the flange portion 62 and the respective insulating support members 40 and which are spaced from one another across the flange portion 62, as best shown in FIG. 2. The bottom support plate 60 includes a pair of downwardly projecting flange portions 63 and 64 at the opposite sides of the bottom support plate 60, as best shown in FIG. 2, for a purpose which will be described hereinafter. The bottom support plate 60 is also adapted to support the operating mechanism 30 of the circuit breaker 10 as will be described in greater detail hereinafter. It is important to note that the insulating support members 40 form the primary structurally connecting members between the upper crossmember 32 and the bottom support plate 60 and that the supporting frame of the circuit breaker 10 relies on the structural strength of said insulating support members to rigidly maintain the various parts on the supporting frame in assembled relation as shown in FIGS. 1 and 2.

As illustrated, the supporting frame of the circuit breaker 10 also includes a pair of spaced side sheets 92 and 94 which may be formed from a suitable metallic material, such as steel, and which are rigidly secured to the upper crossmember 32 by suitable means, such as the bolts 35 which pass through substantially aligned openings provided in said side sheets and the ears or lug portions 32A and 32B of the crossmember 32. The lower portions of the side sheets 92 and 94 are rigidly secured to the bottom support plate 60 by suitable means, such as a plurality of bolts 102, which pass through aligned openings provided in said side sheets and the flange portions 63 and 64, respectively, of the bottom support plate 60. As indicated at 92A, the height of each of the side sheets 92 and 94 may be tapered from a maximum dimension adjacent to the rear of each side sheet where said side sheets are secured to the upper crossmember 32 to a minimum dimension or height approximately halfway toward the front of each of said side sheets. As illustrated, the side sheets 92 and 94 may also include vertically extending flange portions at the front ends of the respective side sheets, as indicated at 92B for the side sheet 92 in FIG. 1, with the flange portions of the respective side sheets projecting laterally toward one another. Where desired, the supporting frame of the circuit breaker 10 may include a front panel or cover (not shown) which may be rigidly secured to the flange portion of the side sheets 92 and 94 by suitable means, such as a plurality of bolts.

In order to structurally connect the side sheets 92 and 94 and for other purposes which will be described hereinafter, the supporting frame of the circuit breaker 10 may also include a generally L-shaped crossmember 92 which is disposed adjacent to the front of the circuit breaker 10 and extends laterally between the side sheets 92 and 94. The crossmember 72 includes at the opposite sides thereof a pair of downwardly extending flange portions (only one shown) as indicated at 72A which are rigidly secured to the associated side sheets 92 and 94 by suitable means, such as a plurality of bolts (not shown), which pass through aligned openings provided in the crossmember 72 and the side sheets 92 and 94. The crossmember 72 also includes an upwardly extending portion as indicated at 72B which is adapted to support a plurality of arc extinguishing means or arc chutes 80 which are disposed in side-by-side relation across the upper portion 72B of the crossmember 72 and which are associated with the respective insulating support members 40. The arc chutes 80 are rigidly secured to the upper portion 72B of the crossmember 72 by suitable means, such as a plurality of spaced bolts 74, which pass through aligned openings provided in the respective arc chutes 80 and the upper portion 72B of the crossmember 72. The arc chutes 80 may each be of the type which is described in detail in copending application Ser. No. 800,106, filed Feb. 18, 1969, by F. Bould and J. H. Taylor and assigned to the same assignee as the present application.

In order to assist in supporting the operating mechanism 30 of the circuit breaker 10 which is described in detail in copending application Ser. No. 770,296 previously mentioned, the supporting frame of the circuit breaker 10 may also include a pair of spaced center or intermediate supporting plates 120 (only one shown) which are disposed generally parallel to the side sheets 92 and 94 and spaced laterally therefrom, as described in detail in the last-mentioned copending application. The center plates 120 are rigidly secured at the bottom portions thereof by suitable means, such as described in detail in copending application Ser. No. 770,296. The upper portions of the center plates 120 may also be rigidly secured to the crossmember 72 by suitable means, such as welding or bolts (not shown).

As illustrated, the circuit breaker 10 is of the three-phase or three-pole type with each of the insulating support members 40 serving to support the separable contacts associated with one of the phases or pole units of the circuit breaker 10. More specifically, each of the pole units of the circuit breaker 10 includes one of the arc chutes 80 which is disposed adjacent to the upper end of one of the associated insulating support members 40, a stationary contact assembly 70 which is supported on or formed with an upper electrically conducting member or terminal member 42, as described in detail in copending application Ser. No. 770,297, filed Oct. 24, 1968, by F. Bould and R. Hauser and issued Feb. 9, 1970 as U.S. Pat. No. 3,562,459 and which is assigned to the same assignee as the present application, and a movable switch or contact arm 50 which is pivotally supported on a lower electrically conducting member or terminal member 44, as indicated in FIG. 1. As described in copending application Ser. No. 770,297 just mentioned, the stationary contact assembly 70 of each pole unit of the circuit breaker 10 includes arcing contact members which are at least partially disposed inside the associated arc chute 80 and is rigidly secured to the associated insulating support member 40 by suitable means, such as bolts (not shown). The upper electrically conducting member or terminal member 42 is disposed to pass through an upper opening 40A in the associated insulating support member 40 and extends rearwardly from the associated insulating support member 40 to support a disconnecting contact assembly (not shown).

The contact arm 50 of each pole unit is pivotally supported on the associated lower electrically conducting member or terminal means 44, which includes a hinge support portion, by suitable means, such as a pivot pin 54, at location which is vertically spaced from the associated stationary contact assembly 70. The lower electrically conducting member 44 is supported by the associated insulating support member 40 and is rigidly secured thereto by suitable means, such as a plurality of bolts (not shown), as described in detail in the last-mentioned copending application. The lower electrically conducting member 44 passes through a corresponding lower opening 40B in the associated insulating support member 40 as shown in FIG. 2 and extends rearwardly to support a lower disconnecting contact assembly (not shown). The contact arm 50 has mounted thereon adjacent to the free end of the contact arm 50 movable arcing contact members and a movable main contact member 52 which are disposed to engage corresponding contact members which form part of the stationary contact assembly 70 when the circuit breaker 10 is in a closed-circuit operating condition, as shown in FIG. 1. The contact arm 50 is movable between a closed operating position, as shown in FIG. 1, to an open operating position which is angularly displaced from the position of the contact arm 50 shown in FIG. 1 about the pivot pin 54 when actuated by an associated operating mechanism 30 which forms part of the circuit breaker 10, as disclosed in detail in copending application Ser. No. 770,296 previously mentioned.

More specifically, in each pole unit of the circuit breaker 10, a separate electrically insulating connecting member 112 is pivotally connected at one end thereof to the associated contact arm 50 and at the other end thereof to a lever 114 which is welded to a common jack or operating shaft 110 which is supported by the center plates 120 and also by the side sheets 92 and 94, where desired.

It is to be noted that each of the arc chutes 80 may be at least partially supported by having the right or rear portion of each arc chute 80 rest upon and be supported by the associated stationary contact assembly 70, as shown in FIG. 1, or alternatively, the right portion of each arc chute 80 might be arranged to rest upon a portion of the associated insulating support member 40, where desired.

In the overall operation of the circuit breaker 10 assuming that the contact arms 50 of the respective pole units of said circuit breaker are in the closed-circuit operating positions shown in FIG. 1 in which the movable contact members on each contact arm 50 engage the associated stationary contact assembly 70, the circuit breaker 10 may be opened manually or automatically tripped open as described in detail in copending application Ser. No. 770,296 previously mentioned. When the circuit breaker 10 is actuated from the closed-circuit operating position shown in FIG. 1, the common jack or operating shaft 110 which is operatively connected to all of the pole units of the circuit breaker 10 is actuated to rotate in a clockwise direction, as viewed in FIG. 1, to thereby actuate the respective contact arms 50 of the different pole units through the levers 114 and the associated connecting members 112 in a counterclockwise direction about the pivot pins 54 of said pole units to the open operating positions of the respective contact arms 50 which are angularly displaced from the closed circuit position shown in FIG. 1 a counterclockwise direction about each of the pivot pins 54.

When the contact arms 50 of the circuit breaker 10 are in the open-circuit positions, the contact arms 50 may be actuated back to the closed-circuit positions indicated in FIG. 1 by the operating mechanism 30 of the circuit breaker 10 by rotating the common jackshaft 110 in a counterclockwise direction to thereby actuate the respective contact arms 50 in a clockwise direction from the open-circuit operating positions to the closed-circuit operating positions shown in FIG. 1 through the levers 114 and the respective connecting members 112.

It is to be understood that in certain applications the plurality of separate insulating support members 40 may be cast or molded as a single unitary electrically insulating support member which forms part of the rear wall portion 20 of the supporting frame of the circuit breaker 10 with all of the pole units of the circuit breaker 10 having their separable contact structures mounted on the single electrically insulating support member. Such a unitary insulating support member would preferably be formed from the electrically insulating materials previously indicated which have a relatively high structural strength to perform the structural functions as previously indicated of the separate insulating support members 40 as disclosed.

The apparatus embodying the teachings of the invention has several advantages. For example, a circuit interrupter or circuit breaker having an improved supporting frame as disclosed is relatively simpler in construction than known frame structures of the same general type and involves the assembly of relatively fewer structural parts. This is accomplished by taking advantage of the structural strength of the electrically insulating support members as disclosed. More specifically, the supporting frame of the circuit breaker 10 takes advantage of the structural strength of the electrically insulating support members which form part of the rear wall portion of the supporting frame or framework and which form the primary structural connecting members between the upper crossmember 32 at the rear of the circuit breaker 10 and the bottom support plate 60 as disclosed. The construction of the supporting frame of the circuit breaker 10 as disclosed by the applicants eliminates the need for a substantially rectangular metallic rear wall structural member such as required in conventional supporting frames of the same general type for circuit breakers.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A circuit breaker comprising a supporting frame, said frame including a generally rectangular rear wall portion comprising a metal crossmember extending laterally across said rear wall portion adjacent to the upper end thereof, a plurality of electrically insulating support members disposed in side-by-side relation across said rear wall portion and having the upper ends thereof secured to said metallic crossmember, a bottom support plate disposed to project outwardly from said rear wall portion adjacent to the lower ends of said insulating support members generally perpendicular to said rear wall portion, said bottom support plate including a flange portion which is disposed adjacent to and extends across said rear wall portion, the lower ends of said insulating support members secured to said flange portion, a pair of spaced, relatively stationary, electrically conducting members mounted on each of said insulating support members, and a relatively movable contact arm supported on one of said stationary conducting members and disposed to move between open and closed positions with respect to the other stationary conducting member.

2. The combination as claimed in claim 1 wherein said metallic crossmember is generally angle-shaped in cross section.

3. The combination as claimed in claim 1 wherein the insulating support members are formed from a thermosetting resin material.

4. The combination as claimed in claim 1 wherein the insulating support members are formed from a glass-filled polyester material.

5. The combination as claimed in claim 1 wherein the bottom support plate is adapted to support an operating mechanism for actuating said movable contact arm between said open and closed positions.

6. The combination as claimed in claim 1 wherein a pair of metallic side sheets is secured to said metallic crossmember at the opposite sides of said rear wall portion and secured to said bottom support plate at the opposite sides thereof.

7. The combination as claimed in claim 1 wherein the insulating support members form the primary structurally connecting members of said rear wall portion between the metallic crossmember and the bottom support plate.

8. The combination as claimed in claim 5 wherein the insulating support members are formed from a glass-reinforced thermosetting resin material.

9. The combination as claimed in claim 6 wherein the insulating support members are formed from a glass-filled polyester material.